Nov. 21, 1967   P. T. DURST ET AL   3,354,281
TEMPERATURE CONTROL DEVICE
Filed Dec. 21, 1966   2 Sheets-Sheet 2
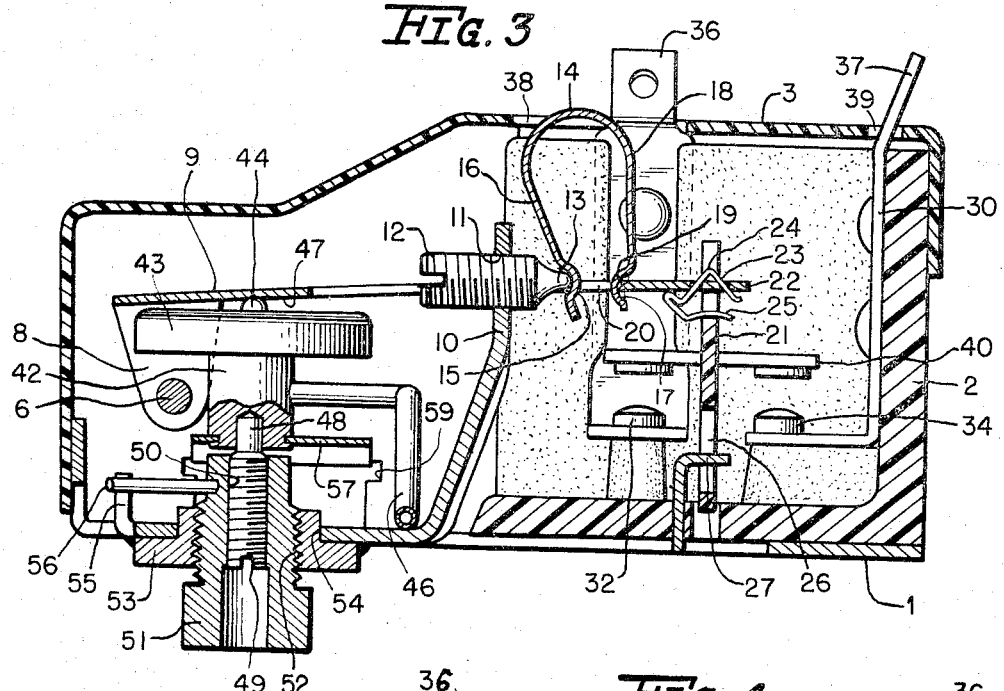
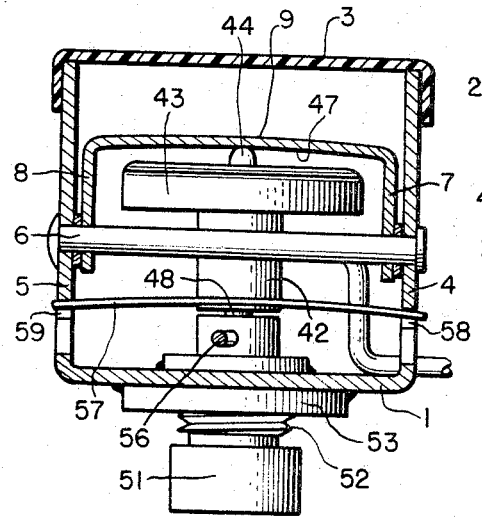
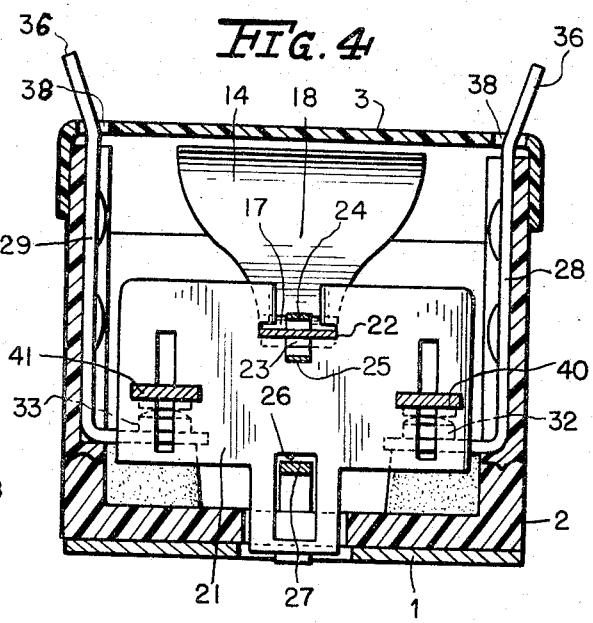
INVENTORS
PAUL T. DURST
ROBERT J. SUTTON
BY
ATTORNEY

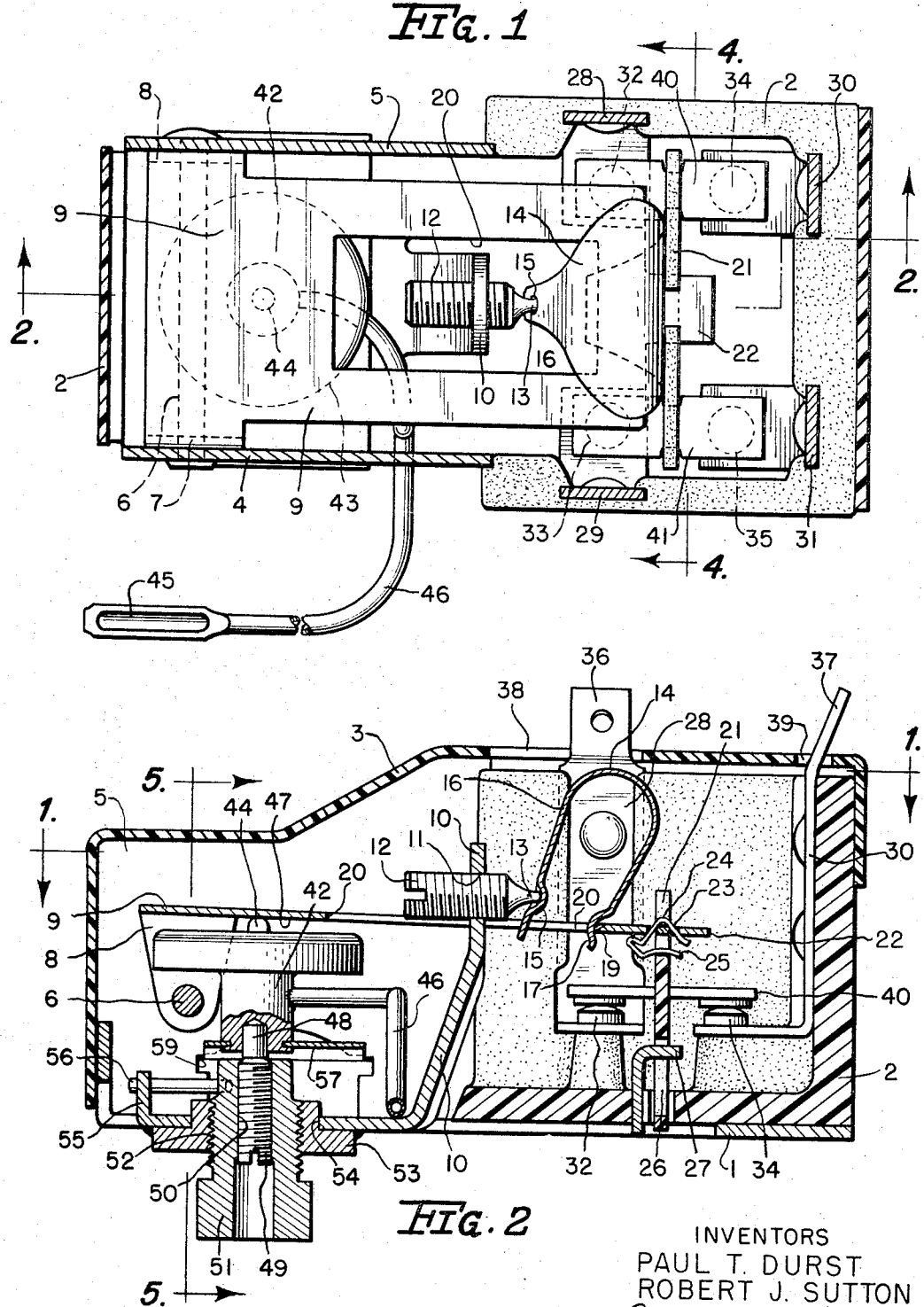

United States Patent Office 3,354,281
Patented Nov. 21, 1967

3,354,281
TEMPERATURE CONTROL DEVICE
Paul T. Durst, Brookfield, and Robert J. Sutton, Chicago, Ill., assignors to General Electric Company, a corporation of New York
Filed Dec. 21, 1966, Ser. No. 603,581
6 Claims. (Cl. 200—140)

ABSTRACT OF THE DISCLOSURE

This invention relates to temperature control devices. More particularly, it relates to such a device of the type using a leaf spring element, pivoted at one end and operated by a temperature-sensitive element bearing against it near the pivot axis.

---

It is an object of our invention to provide a temperature control device of this type wherein accurate and swift movement of the spring element may be achieved by a relatively small force provided in response to the achievement of a predetermined temperature.

It is a further object of our invention to provide such a device with a leaf spring in which there is no reversal of stress, but merely a change in the degree to which stress is exerted in a predetermined direction.

It is a further specific object of our invention to provide these advantages in a temperature control device where the leaf spring is pivoted on an axis substantially below its own plane.

In one aspect thereof, our invention provides a temperature-responsive device wherein a substantially planar spring blade member is pivotally mounted in a frame about an axis which is substantially to one side of the blade member, and adjacent one end thereof. The blade member is maintained in tension by a spring which has one end pivotally mounted to the blade member. The end of the spring which is mounted on the frame is positioned on the other side of the plane of the blade member from the pivotal axis thereof; the other end of the spring, pivotally connected to the blade member, is more remote from the pivot axis of the blade member than the first end of the spring.

Adjacent to the pivoted end of the blade, there is a temperature-sensitive member arranged to exert a force on it from the same side as the pivot axis; when the force reaches a certain level as a result of temperature change, the blade snaps to a second position. Means are provided to limit the movement of the other end of the blade (which may carry electrical contact means) so as to maintain the junction point of the spring and the blade member always on the same side of a line connecting the pivot axis to the point at which the spring is pivotally mounted on the frame.

This structure provides the advantages of high reliability, low forces required, and good contact pressure, while at the same time it is both simple and reliable.

The subject matter which we regard as our invention is particularly pointed out and distinctly claimed in the concluding portion of this specification. Our invention, both as to organization and method of operation together with further advantages and objects thereof, may best be understood by reference to the following description taken in conjunction with the accompanying drawings.

In the drawings, FIGURE 1 is a top elevational view of the improved temperature control device of my invention, with the top cover member thereof removed;

FIGURE 2 is a view along line 2—2 in FIGURE 1;
FIGURE 3 is a view identical to FIGURE 2, showing the device in its actuated condition;
FIGURE 4 is a view along line 4—4 in FIGURE 1; and
FIGURE 5 is a view along line 5—5 in FIGURE 2.

Referring now to FIGURES 1, 2, 3, and 4 of the drawings, there is shown a temperature control device wherein a protective enclosure is provided by means of a metal base member 1, a plastic housing member 2, and a top plastic base member 3. These three members are secured together, by any conventional means (not shown), so as to provide an enclosure within which the operating parts of the device are secured.

Referring to FIGURE 5 in conjunction with FIGURES 1 and 3, member 1 has upstanding side walls 4 and 5 at left end thereof, as viewed in FIGURES 1 and 3. Connected across these walls so as to be supported thereby is a pin 6. The pin may be supported in any suitable manner; as shown in FIGURE 5, one approach is to form it as a rivet so that it is rigidly connected to and extends between the two upstanding walls 4 and 5. Pivotally mounted on this pin, by means of a pair of downwardly extending flanges 7 and 8 formed at one end thereof, is a leaf spring member 9. Leaf spring 9 is formed of a material having good spring characteristics and which is relatively insensitive to thermal charges. For instance, regular stainless steel, having 18% chromium and 8% nickel, has been found to provide good results.

Metal base 1 also has an upstanding flange 10 (FIGURE 2) with a threaded opening 11 therein through which extends a threaded member 12 with a fulcrum point 13 formed at one end. A U-shaped spring 14 has a depression 15 formed at the end of one leg 16, and a depression 17 formed at the end of its other leg 18. The spring is positioned so that the depression 15 receives the end 13 of member 12 in pivotal relationship therewith, and so that the depression 17 receives the knife edge 19 formed at the right end of an opening 20 provided in leaf spring 9.

An insulator member 21 is connected to the free end end 22 of blade 9 so as to be carried by the blade but also so as to have a slight degree of pivotal movement relative thereto. A small spring 23 may be provided, with its top 24 connected to end 22 of blade 9, and its bottom 25 bearing down on member 21; this causes a generally perpendicular relationship of the insulator member 21 and the blade end 22 to prevail despite the relatively limited free connection thereof.

At its lower end, the insulator member 21 has an opening 26 through which extends a tang 27 struck up from frame member 1. It can readily be seen that as the blade 9 pivots about pin 6, the upward movement of end 22 thereof is limited by tang 27 within opening 26. In other words, when the blade is moving upwardly the upward motion is stopped when the tang 27 strikes the bottom of opening 26. The position of tang 27 and opening 26 is such that the span of motion of blade 9 is restricted so that, even when the blade is in its uppermost position, the knife edge 18 is still below a plane drawn through the pivot pin 6 and the fulcrum 13. As will be explained hereinbelow, this relationship is important to achievement of the advantages of our invention.

Secured within the housing member 2 are terminal members 28, 29, 30, and 31. These terminals have formed on them, respectively, contacts 32, 33, 34, and 35. As can be seen in FIGURE 2 with respect to terminals 28 and 30, ends 36 and 37 thereof extend through appropriate openings 38 and 39 formed in insulating cover 3. The same is of course, the case for terminals 29 and 31.

The insulator member 21 supports bridging contacts 40 and 41 on opposite sides thereof (FIGURES 1, 2, and 4). Each of the bridging contacts is supported at its center so that it is horizontally balanced. As can be seen with reference to FIGURES 2, and 3, when blade 9 is snapped to its down position, the downward limit of movement is determined by the engagement of the bridging contact 40 with contacts 32 and 34; at the same time, the bridging contact 41 engages contacts 33 and 35. When the blade 9 is snapped upwardly, as explained above, the end 22 thereof moves up carrying with it insulating member 21 and the bridging contacts, and when tang 27 engages the bottom of opening 26, the upward movement ceases.

In order to operate blade 9, a thermostatic device 42 is provided. Device 42 is of the conventional type which includes a portion 43 having a projection 44, the extent of projection of part 44 being dependent upon the temperature sensed by a bulb 45 (FIGURE 1) connected to part 42 by a tube 46. When the temperature sensed at bulb 45 increases, there is an increase in the pressure of the fluid within the bulb. This pressure increase is transmitted through tube 46 into part 42, forcing the projection 44 outwardly. The top of the projection 44 rests on the underside 47 of blade 9, adjacent the pivoted end of the blade.

Part 42 is secured on the end of 48 of a threaded member 49 which, in turn, is mounted in the internally threaded portion 50 of a member 51 also having an externally threaded portion 52. Member 51 is threadedly mounted in the structure 53, which in turn is secured in an opening 54 formed in frame 1. It will readily be observed that, once member 51 has been mounted in frame 1, the exact position of member 42—and therefore of the projection 44—may be accurately determined by means of threaded member 49.

The thermostatic device as a whole is restrained against movement by tangs 55 which are struck up out of frame 1 and engage a projecting rod 56 extending from member 51. In this manner, rotation of threaded member 49 will cause movement of portion 42 of the thermostat rather than rotation of threaded member 51.

It will be observed that portion 42 is simply mounted on end 48, and is not rigidly secured thereto in any manner. A spring member 57 is arranged in openings 58 and 59 formed in walls 4 and 5 of frame 1. Spring 57 bears downwardly on portion 42 (FIGURE 5) and thus maintains this portion in firm contact with end 48 of threaded member 49. Thus, movement in and out of the threaded member 49 constitutes an exact adjustment for the thermostat as a result of the bias of spring 57.

Prior to describing the operation of our thermostat, it is to be reemphasized that a line between the pivot 6 and the fulcrum 13, when extended, will always be above the knife edge 18 where it engages portion 17 of spring 14. There is also the important point that the position of the pivot axis below the blade, together with the tension provided on the blade by spring 14, imposes a downward bow in the blade; the degree of bowing is somewhat dependent on the extent to which the pivot point is located below the blade itself.

With the temperature below the predetermined set point of the thermostat, the control device is in the position shown in FIGURE 2, that is, the bridging contacts are completing a circuit between terminals. When the temperature rises to a predetermined level, the pressure exerted by projection 44 on the underside 47 of blade 9 causes the blade to snap to the position shown in FIGURE 3. In this position, the contacts are separated. The knife edge 19 of the blade, it will be noted, is still below a line drawn between pivot 6 and fulcrum 13.

If the temperature decreases so that the projection 44 starts to withdraw, then after a relatively small amount of movement (providing a small temperature differential), the blade 9 will snap back to its position of FIGURE 2 so that the electrical circuits are completed.

The exact reason for the excellent snap action which is obtained in both directions of movement of the blade, without passing over the central line defined by pivot 6 and fulcrum 13, is not fully understood. It appears, however, that it results in part from the force exerted by U-spring 14, provided that force is great enough to hold blade 9 in the position of FIGURE 2 until the projection 44 provides a noticeable amount of bending in the blade.

To give a specific example of a structure which has been found highly effective in operation, a blade 9, made of the hard 18–8 stainless steel alloy with a minimum tensile strength of 185,000 p.s.i., was used. The blade was about .018 inch in thickness and was at a distance of .312 inch from its pivot axis 6. For this structure, and with the projection 44 providing a load at about 1.661 inches from the pivoted end of the blade, it was found that a one-pound load provided by projection 44 would permit the blade to snap back and forth and provide a 20 gram force on the contacts. This is a very substantial amount of contact force for a relatively small thermostat-induced force; therefore, the entire structure is more economical to provide since a more economical thermostat may be used.

While in accordance with the patent statutes, we have described what, at present, is considered to be the preferred embodiment of our invention, it will be obvious to those skilled in the art that various changes and modifications may be made therein without departing from the invention, and it is therefore aimed in the appended claims to cover all such equivalent variations as fall within the true spirit and scope of our invention.

What we claim as new and desire to secure by Letters Patent of the United States is:

1. A temperature responsive device comprising:
 (a) a frame;
 (b) a substantially planar spring blade member;
 (c) means mounting said blade member to said frame for pivotal motion about an axis substantially to one side of said member and adjacent an end thereof;
 (d) a spring having one end pivotally mounted on said frame on the other side of said blade member, and having its other end pivotally mounted to said blade member, said spring being positioned so that its other end is more remote from the pivot axis of said blade member than its one end whereby said spring puts said blade member in tension;
 (e) electrical contact means carried by said blade member adjacent the other end thereof;
 (f) a temperature sensitive member arranged to exert a force on said blade member adjacent said one end thereof from the same side thereof as said pivot axis, said temperature sensitive member being movable generally perpendicular to said blade member in response to temperature changes;
 (g) and means limiting movement of the other end of said blade member to maintain the junction point of said spring and said blade member always on the same side of a line connecting said pivot axis to the point at which said spring is pivotally mounted to said frame.

2. The device defined in claim 1 wherein said spring is U shaped, with the outer end of one leg being pivotally mounted on said frame and the outer end of the other leg being pivotally mounted to said blade.

3. The device defined in claim 1 wherein insulating means are supported by said blade member, and said electrical contact means are carried by said insulating means.

4. The device defined in claim 3 wherein said insulating means comprises a sheet of insulating material pivotally secured to the outer end of said blade member, said sheet having an opening therein, said frame having a tang extending into said opening to provide a stop for limiting movement of said blade member in the contact-opening direction.

5. The device defined in claim 4 wherein an additional small light spring is engaged between the end of said blade member and said sheet to bias said sheet into a substantially perpendicular relationship relative to said blade member.

6. The device defined in claim 1 wherein said blade is positioned for up and down movement, with the down movement providing closure of said contact means and the up movement providing opening of said contact means.

References Cited

UNITED STATES PATENTS

| | | | |
|---|---|---|---|
| 2,184,339 | 12/1939 | Ettinger | 200—140 |
| 3,096,419 | 7/1963 | Howell | 200—140 |
| 3,096,420 | 7/1963 | Dills | 200—140 |
| 3,114,813 | 12/1963 | Durst | 200—140 |
| 3,293,394 | 12/1966 | Staples | 200—140 |

BERNARD A. GILHEANY, *Primary Examiner.*

H. B. GILSON, *Assistant Examiner.*